United States Patent
Asonye et al.

(10) Patent No.: US 11,363,101 B2
(45) Date of Patent: Jun. 14, 2022

(54) USING EXISTING SERVERS IN A WELLBORE ENVIRONMENT AS DATA SOURCES FOR STREAMING SERVERS

(71) Applicant: Landmark Graphics Corporation, Houston, TX (US)

(72) Inventors: Donald Chinwe Asonye, Houston, TX (US); Tarkan Karadayi, Tomball, TX (US); Trey Joseph Elliott, Houston, TX (US); Wilbert J. Chenevert, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 16/954,621

(22) PCT Filed: Mar. 8, 2018

(86) PCT No.: PCT/US2018/021617
§ 371 (c)(1),
(2) Date: Jun. 17, 2020

(87) PCT Pub. No.: WO2019/172917
PCT Pub. Date: Sep. 12, 2019

(65) Prior Publication Data
US 2020/0382600 A1 Dec. 3, 2020

(51) Int. Cl.
*H04L 67/12* (2022.01)
*G06F 16/2455* (2019.01)
(Continued)

(52) U.S. Cl.
CPC .............. *H04L 67/12* (2013.01); *E21B 41/00* (2013.01); *G06F 9/547* (2013.01);
(Continued)

(58) Field of Classification Search
CPC ......... H04L 67/12; H04L 67/40; H04L 67/42; H04L 67/02; H04L 69/08; H04L 69/26;
(Continued)

(56) References Cited

U.S. PATENT DOCUMENTS 5,659,685 A  8/1997 Williams et al.
5,682,534 A  10/1997 Kapoor et al.
(Continued)

FOREIGN PATENT DOCUMENTS

EP  1494417  1/2005
GB  2456232  7/2009
(Continued)

OTHER PUBLICATIONS

McKenzie et al, A New Communication Protocol for Real-Time Decision Making, Sep. 6, 2016, Society of Petroleum Engineers Intelligent Energy International Conference and Exhibition, SPE-181088-MS (Year: 2016).*
(Continued)

*Primary Examiner* — Blake J Rubin
(74) *Attorney, Agent, or Firm* — Kilpatrick Townsend & Stockton LLP

(57) ABSTRACT

A streaming server can receive a request from a client device to access data about a wellbore environment in a database server. The database server can be communicatively coupled to a server, which can be communicatively coupled to the streaming server. The streaming server can communicate data in a standardized format with the server using a request and response protocol. The streaming server can communicate the wellbore environment data from the database server in a streaming format with the client device.

20 Claims, 6 Drawing Sheets

(51) Int. Cl.
  *G06F 16/25* (2019.01)
  *E21B 41/00* (2006.01)
  *G06F 9/54* (2006.01)
  *H04L 67/02* (2022.01)
  *H04L 67/133* (2022.01)
  *H04L 67/01* (2022.01)
  *H04L 69/08* (2022.01)
  *H04L 69/00* (2022.01)

(52) U.S. Cl.
  CPC ...... *G06F 16/24568* (2019.01); *G06F 16/258* (2019.01); *H04L 67/02* (2013.01); *H04L 67/40* (2013.01); *H04L 67/42* (2013.01); *H04L 69/08* (2013.01); *H04L 69/26* (2013.01)

(58) Field of Classification Search
  CPC .. G06F 16/24568; G06F 16/258; G06F 9/547; E21B 41/00
  See application file for complete search history.

(56) References Cited

U.S. PATENT DOCUMENTS

| | | | |
|---|---|---|---|
| 5,953,340 | A | 9/1999 | Scott et al. |
| 6,519,568 | B1 | 2/2003 | Harvey et al. |
| 7,519,601 | B2 | 4/2009 | Dittmar |
| 7,546,613 | B2 | 6/2009 | Ikeda et al. |
| 8,121,971 | B2 | 2/2012 | Edwards et al. |
| 8,356,100 | B2 | 1/2013 | Zhu et al. |
| 8,429,288 | B2 | 4/2013 | Wang |
| 8,862,760 | B1 | 10/2014 | Fox |
| 8,892,891 | B1 | 11/2014 | Audebert et al. |
| 9,074,468 | B1* | 7/2015 | Selman ................. E21B 47/13 |
| 9,197,913 | B2 | 11/2015 | Pedlow et al. |
| 9,361,303 | B2 | 6/2016 | Tait et al. |
| 10,590,761 | B1* | 3/2020 | Bermudez Martinez ................. E21B 47/26 |
| 2004/0225724 | A1 | 11/2004 | Pavlik et al. |
| 2007/0047279 | A1* | 3/2007 | Evans ................. G06F 9/541 365/1 |
| 2009/0132458 | A1* | 5/2009 | Edwards ................. G06N 5/025 702/9 |
| 2009/0182472 | A1* | 7/2009 | Singh ................. E21B 47/12 701/50 |
| 2010/0235101 | A1* | 9/2010 | Aamodt ................. E21B 44/00 702/9 |
| 2012/0274664 | A1* | 11/2012 | Fagnou ................. G06F 3/04855 345/173 |
| 2013/0083031 | A1* | 4/2013 | Lehnherr ................. G06Q 10/06 345/440 |
| 2013/0254416 | A1* | 9/2013 | Abraham .......... H04L 29/08756 709/230 |
| 2014/0070956 | A1* | 3/2014 | Winkler ................. E21B 44/00 340/870.01 |
| 2014/0083688 | A1* | 3/2014 | Rojas ................. E21B 44/00 340/853.2 |
| 2014/0156806 | A1* | 6/2014 | Karpistsenko ......... G06Q 50/28 709/219 |
| 2015/0089021 | A1* | 3/2015 | Bergbauer .......... H04L 67/1097 709/217 |
| 2016/0053605 | A1* | 2/2016 | Abbassian ............. G05B 15/02 702/6 |
| 2017/0034311 | A1 | 2/2017 | Govind et al. |
| 2017/0342808 | A1* | 11/2017 | Dykstra ................. E21B 41/00 |
| 2017/0352169 | A1* | 12/2017 | Flanagan ............. G06T 11/206 |
| 2018/0171774 | A1* | 6/2018 | Ringer ................. E21B 47/024 |
| 2018/0298746 | A1* | 10/2018 | Short ................. E21B 41/00 |
| 2019/0170898 | A1* | 6/2019 | Contreras Otalvora ..................... E21B 47/00 |
| 2019/0347590 | A1* | 11/2019 | Rajasekaran ...... G06Q 10/0635 |

FOREIGN PATENT DOCUMENTS

| | | |
|---|---|---|
| WO | 2007092384 | 8/2007 |
| WO | 2017070025 | 4/2017 |

OTHER PUBLICATIONS

"WITSML Overview Guide", Energistics Energy Standard, Mar. 18, 2016, 23 pages.
International Application No. PCT/US2018/021617, "International Search Report and Written Opinion", dated Nov. 27, 2018, 12 pages.
"ETP v1.1 for WITSML v1.4.1.1 Implementation Specification", Energistics, Available Online at: https://www.energistics.org/wp-content/uploads/2018/01/ETP_v1.1_for_WITSML_v1411_Imp_Spec_v1.0_Doc_v1.0.pdf, Oct. 2017, 24 pages.
"WITSML V2.0 Release Candidate Overview Webinar", Energistics Organization, Available Online at: https://www.youtube.com/watch?v=ptb501-KoUg, Jul. 2016, 17 pages.
GB Application No. GB2011520.0 , "First Examination Report", dated Feb. 21, 2022, 3 pages.

* cited by examiner

US 11,363,101 B2

USING EXISTING SERVERS IN A WELLBORE ENVIRONMENT AS DATA SOURCES FOR STREAMING SERVERS

TECHNICAL FIELD

The present disclosure relates generally to systems and methods for use in a wellbore environment. More specifically, but not by way of limitation, this disclosure relates to using existing servers as data sources for streaming servers to provide access to data about a wellbore environment.

BACKGROUND

Data from a wellbore environment can be used to monitor the environment, make decisions with respect to the environment, and plan for further wellbores, among other purposes. A data source, such as a data server, at a wellbore environment can store data obtained from various sensors and the data can be accessible by other devices. Data can be accessed remotely through a request and response protocol by which the client outputs a request for certain types of data and the data source responds to the request with the data. The device is often located great distances from the data source and the data exchange is often over a Wide Area Network (WAN) for which there may be delays in accessing the data.

DETAILED DESCRIPTION

Figure 1:
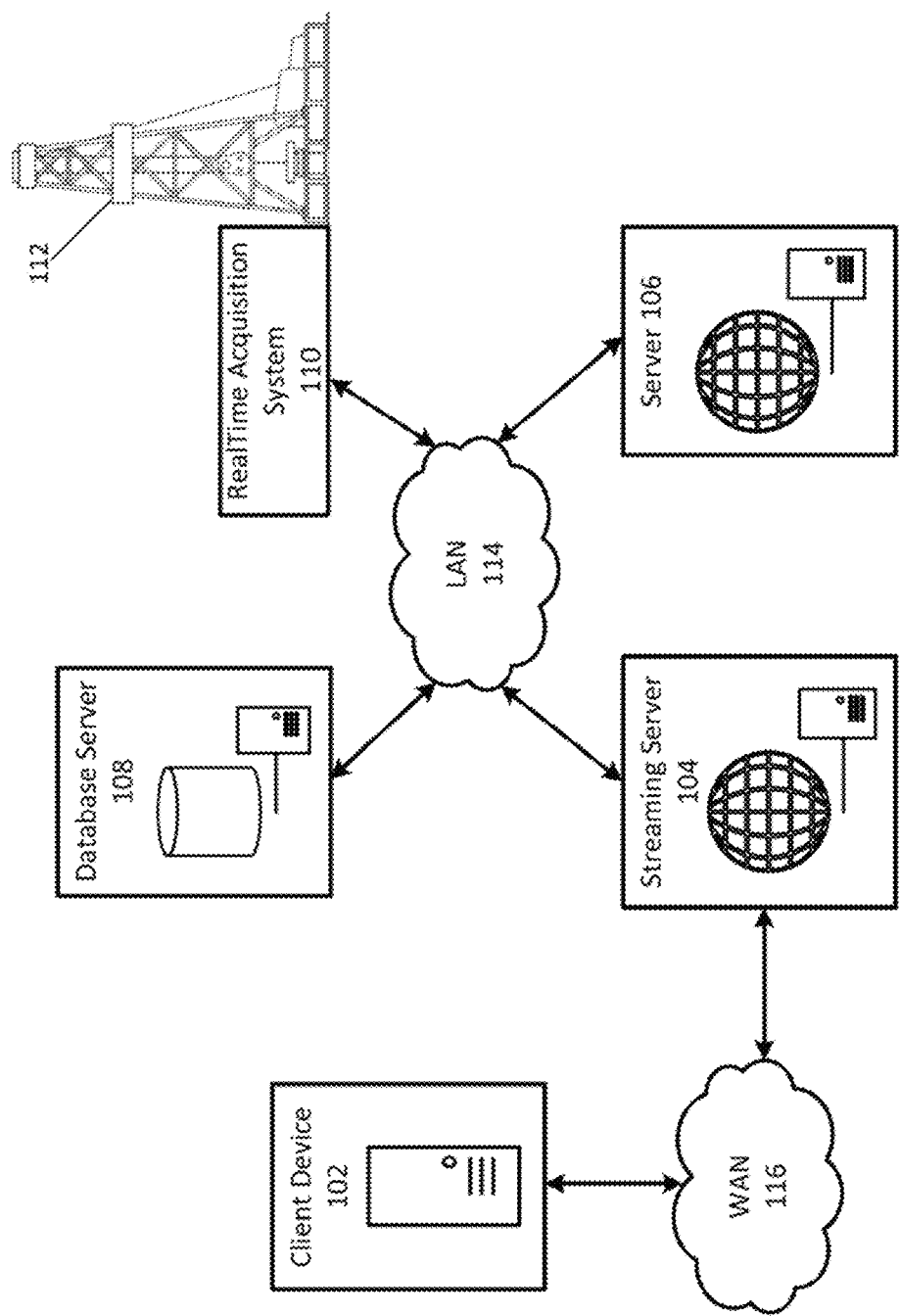
FIG. 1 is a schematic of an example of a network environment used to provide access to data about a wellbore environment according to one aspect of the disclosure.

Certain aspects and features of the present disclosure relate to using an existing server as a data source for a streaming server to provide access to data about a wellbore environment. A client device can send a request across a Wide Area Network (WAN) in a streaming data format to a streaming server for accessing wellbore environment data in a database server. The streaming server, using a request and response protocol, can communicate data in a standardized format over a Local Area Network (LAN) with an existing server, which can use a different request and response protocol. The existing server can request and retrieve data relating to a wellbore environment from a database server. The streaming server can communicate the wellbore environment data, relayed by the existing server, in a streaming format with the client device. Transceiving data via the request and response protocols of an existing server over a WAN can be time consuming, increasing the time for a client device to receive requested data. Comparatively, streaming data over the WAN via a streaming server while executing the slower existing server request and response protocols across a LAN can reduce overall latency within the communication pathway. Additionally, implementing a streaming server can provide an efficiency gain on the aggregate amount of data traversing the network: a request and response protocol typically requires state information to be sent on each request so that the server can return the proper data, requiring more bandwidth.

In certain examples, the streaming server can be an adaptor between client devices and existing servers that do not employ the latest industry standard protocols. The streaming server can bridge communication between two different protocols to allow client devices to obtain data from existing servers. The intermediary streaming server can enable continued use of existing servers without having to develop an entirely new server or refactor an existing server to communicate via the latest protocols. Without the streaming server exchanging information across various protocols, clients may consume considerable resources to restructure and rebuild data flows through existing servers to communicate with servers employing the latest protocol. Employing streaming servers using existing servers as data sources can allow data to be automatically forwarded to client devices, as opposed to a client device requesting and receiving data directly from existing servers, which can be a slower process.

In certain examples, the streaming server and the existing server can be communicatively coupled through a LAN, and the streaming server and the client device can be communicatively coupled through a WAN. Communicatively coupling a streaming server to an existing server through a LAN, as compared to a WAN, can reduce time to transfer data to a client device. The request and response protocol of the existing server, which operates less efficiently than a streaming protocol, is performed locally across a LAN and the streaming protocol is performed across a WAN. Client devices are typically connected to data sources via a WAN, which is generally slower than a LAN, out of necessity (e.g., remote or off-site location). It can be desirable in the context of overall system performance to implement more time consuming request and response protocols across a LAN, while faster streaming server protocols can be implemented across the slower, necessary WAN. In some examples, the client device may be located within the same LAN as the streaming server and existing server. In other examples, the request and response protocols may be performed across a WAN, losing the reduced latency benefit of the previous examples but retaining the ability to bridge communication protocols between the client device and the existing server. For example, the client device is communicatively coupled to the streaming server via a WAN or LAN and the streaming server is communicatively coupled to the existing server via a WAN.

In some examples, versions of Well Information Transfer Standard Markup Language (WITSML) can be employed. WITSML is a data exchange standard for specifying and exchanging data for wells and well-related operations and objects, such as drilling, logging and mud logging. WITSML can provide right-time, seamless flow of well data between operators and service companies to hasten and enhance decision making. WITSML 2.0 was developed to improve data communications within the petroleum industry. The underlying protocol of WITSML 2.0 is Energistics Transfer Protocol (ETP), which can operate at faster data exchange speeds than prior versions of WITSML. ETP defines a streaming mechanism so that data receivers do not have to poll for data and can receive new data as soon as they are available from a data provider.

An example of a streaming server can be a server employing WITSML 2.0 using ETP. The streaming server can allow for data streaming such that data is communicated to a client device in response to the data being available, without requiring the client device to specifically requesting the data (i.e., data is automatically forward to the client device by the streaming server when the data is available from a data source).

An example of an existing server can be a WITSML 1.x server, where "1.x" represents any version of WITSML 1.0 prior to WITSML 2.0 (e.g., WITSML 1.0, WITSML 1.3.1, WITSML 1.4.1.1, etc.). A client device or streaming server can initiate a request for data via a request and response protocol to obtain information from an existing server.

In some examples, the request and response protocol used by the streaming server to communicate with an existing server can include Simple Object Access Protocols (SOAP). SOAP is a protocol specification for exchanging structured information in the implementation of web services in computer networks. SOAP employs an XML Information Set message format, and relies on application layer protocols, such as Hypertext Transfer Protocol (HTTP) or Simple Mail Transfer Protocol (SMTP), for message negotiation and transmission. SOAP can allow processes running on disparate operating systems (such as Windows and Linux) to communicate using Extensible Markup Language (XML), and can allow clients to invoke web services and receive responses independent of language and platforms. In some examples, the request and response protocol used by the existing server can be based on Remote Procedure Protocol (RPC), which is distinct from SOAP. An RPC can execute a procedure in a different address space, commonly on another computer on a shared network, which is coded as if it were a local procedure call.

In some examples, the streaming server can generate a polling task corresponding to a specific channel of the existing server. The polling task of the streaming server can transmit instructions to the existing server. The polling task can include instructions to direct the existing server to relay data within a database server to the streaming server. In response to receiving the polling task instructions via consecutive data request from the streaming server, the existing server can relay data within the database server to the streaming server as it becomes available. In response to receiving data within the database server from the existing server, the streaming server can determine if any data is new or changed.

In some examples, the streaming server can convert data received from a client device into a standardized data format. An example of a standardized data format is a WITSML 1.x format. The streaming server can convert data received from an existing server into a streaming data format. The streaming data format can be a WITSML 1.x format using ETP. Conversions between a streaming data format and a standardized data format can allow the streaming server to communicate data in an understandable format from the client device to the existing server and from the existing server to the client device.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 depicts a schematic of a network environment used to provide access to data about a wellbore environment according to one example. A client device 102 can be communicatively coupled via a WAN 116 to a streaming server 104, which can be communicatively coupled to the server 106 through a LAN 114. A server 106 can be an "existing server" as described in any of the aforementioned examples. The client device 102, the streaming server 104, and the server 106 can be communicatively coupled in a network configuration as described in any of the aforementioned examples.

The server 106 can be communicatively coupled to a database server 108, which can be communicatively coupled to a realtime acquisition system 110. In some examples, the server 106 can be located near the database server 108, connected to the database server via the LAN 114. In other examples, the server 106 can be located remotely from the database server 108 and connected via a WAN. The realtime acquisition system 110 can be communicatively coupled to a well system 112. The realtime acquisition system 110 can be located near or within the well system 112 environment, or located remotely and communicatively coupled to devices within the well system 112 via a network. Data relating to the well system 112 can be received by the realtime acquisition system 110 from the well system 112. The database server 108 can receive data pertaining to the well system 112 from the realtime acquisition system 110. The database server 108 can store new or update existing data in response to receiving data from the realtime acquisition system 110. In some examples, the database server 108 can be located near the realtime acquisition system 110, connected to the realtime acquisition system 110 via the LAN 114. In other examples, the database server 108 can be located remotely from the realtime acquisition system 110 and connected via a WAN.

The client device 102 can issue a request and receive responses from the streaming server 104 in a streaming data format. The streaming server 104 can interpret the request from the client device 102, convert the request and associated data into a standardized data format, and forward the request to the server 106. The server 106 can receive the request in a standardized data format from the streaming server 104. The request can direct the server 106 to request data from the database server 108. The database server 108 can transmit any data to the server 106 in response to the request received from the server 106. In response to receiving the requested data from the database server 108, the server 106 can format the data into a standardized data format and transmit the data to the streaming server 104. In response to receiving the data in a standardized data format from the server 106, the streaming server 104 can convert the data into a streaming data format and transmit the data to the client device 102. Through the previously described connections, the client device 102, making initial requests in a format not interpretable by a standardized data format server (e.g., server 106), can request and indirectly receive data from a database server 108 via streaming server 104 and server 106. The streaming server 104 can act as an intermediary between the client device 102 and the server 106, communicating to the client device 102 and the server 106 via separate communications protocols and converting data and requests into the proper data formats.

Figure 2:
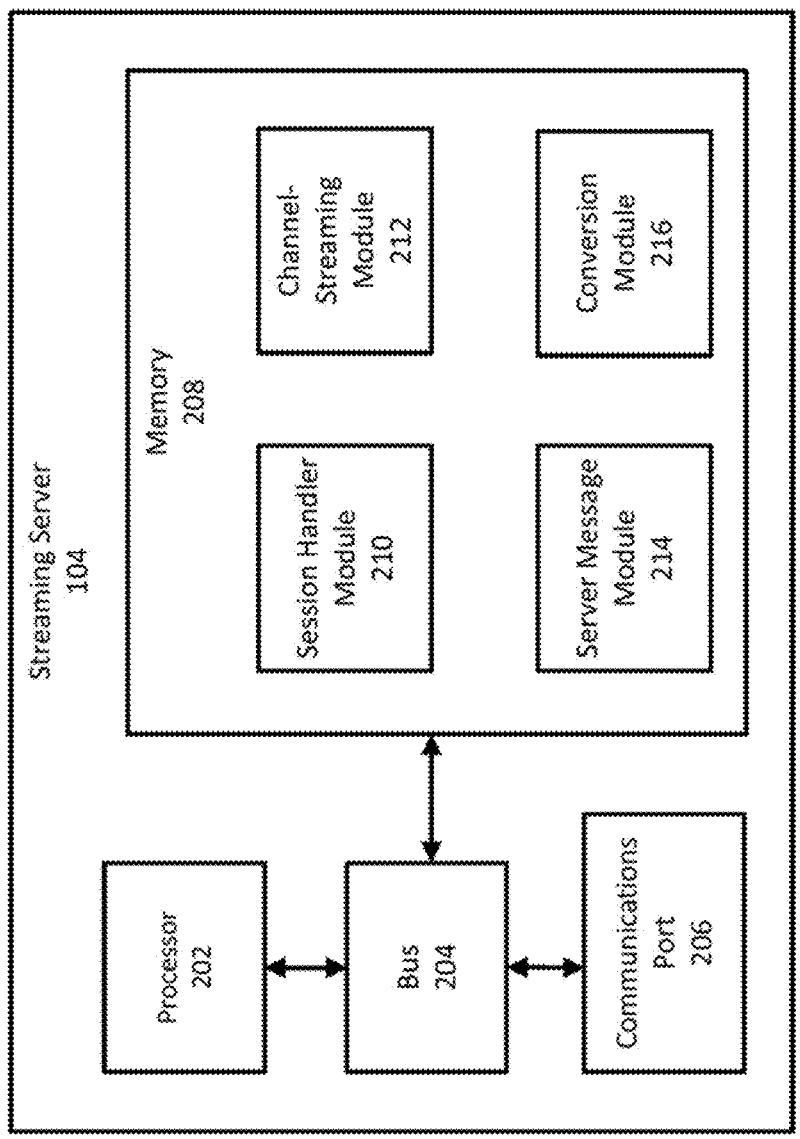
FIG. 2 is a block diagram of an example of a streaming server usable for executing program code for using existing servers as data sources according to one aspect of the disclosure.

FIG. 2 is a block diagram of an example of a streaming server 104 usable for executing program code for using existing servers as data sources according to one example. The streaming server 104 can include a processor 202, a bus 204, a communications port 206, and a memory 208. In some examples, the components shown in FIG. 2 (e.g., the processor 202, the bus 204, the communications port 206, and the memory 208) can be integrated into a single structure. For example, the components can be within a single housing. In other examples, the components shown in FIG. 2 can be distributed (e.g., in separate housings) and in electrical communication with each other.

The processor 202 can execute one or more operations for implementing some examples. The processor 202 can execute instructions stored in the memory 208 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 can be communicatively coupled to the memory 208 via the bus 204. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 can include a medium from which the processor 202 can read instructions. A computer-readable medium can include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The memory 208 can include program code for a session handler module 210, a channel-streaming module 212, a server message module 214, and a conversion module 216. The session handler module 210, in response to receiving a communication request via the communications port 206, can set up and configure communication channels in preparation for communicating data by implementing any necessary handshaking protocols. The session handler module 210 can initiate communications channels between the streaming server 104 and the client device 102 and the streaming server 104 and the server 106. The channel-streaming module 212 can configure communications channels for streaming data between the streaming server 104 and the server 106 by transmitting start poll and stop poll requests to the server 106 via the communications port 206. The server message module 214 can handle request and response protocols used by the streaming server 104 to communicate with the server 106. The request and response protocol used by the streaming server 104 to communicate with the server 106 may include SOAP requests and responses. The server message module 214 can send a request to and receive a response from the server 106 via the communications port 206. The conversion module 216 can convert requests in a streaming data format, received from the client device 102, into requests in a standardized data format. The conversion module 216 can convert responses and data in a standardized data format, received from the server 106 in response to the request by the client device 102, into a streaming data format.

Figure 3:
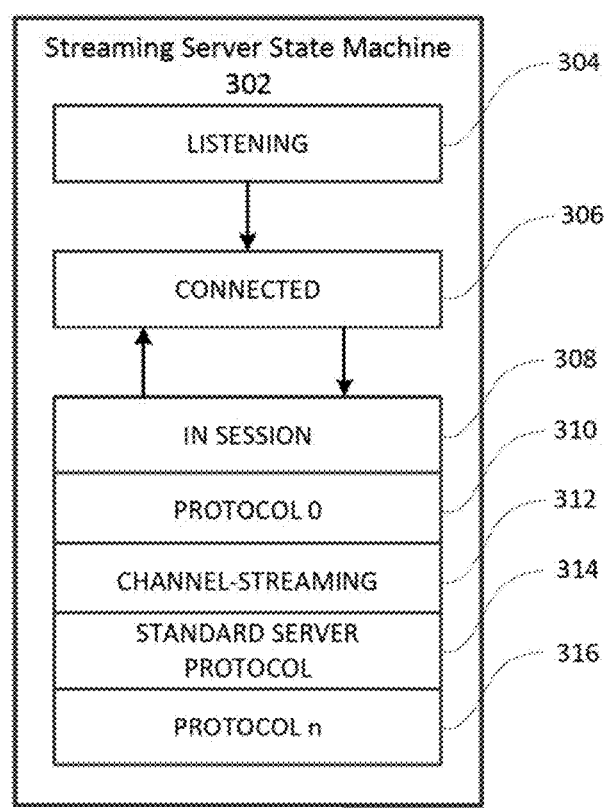
FIG. 3 is a state diagram of a streaming server state machine according to one aspect of the disclosure.

FIG. 3 is a state diagram of a streaming server state machine 302 according to one example. At block 304, the streaming server 104 is actively listening for devices within a network, which can be performed on a well-known URL. At block 306, a client (e.g., client device 102) capable of communicating via streaming messages in a streaming data format connects to the streaming server 104 and issues an open session message, which may be an Open Session ETP message. The communications channel between the client and the streaming server 104 is set up and configured by the session handler module 210, which can implement ETP Protocol 0 in block 310 to handle initial handshaking procedures. Once connected, shown in block 308, the client can issue messages within a given session.

Multiple protocols are defined within the streaming server state machine 302: Protocol 0 in block 310, channel streaming protocol in block 312, standard server protocol in block 314, and any other protocol delineated as protocol n in block 316. Messages in a streaming data format received by the streaming server 104 are relayed to the channel-streaming module 212 for processing by the channel streaming protocol in block 312. Messages in a standardized data format received by the streaming server 104 are relayed to the server message module 214 for processing by the standard server protocol in block 314.

Figure 4:
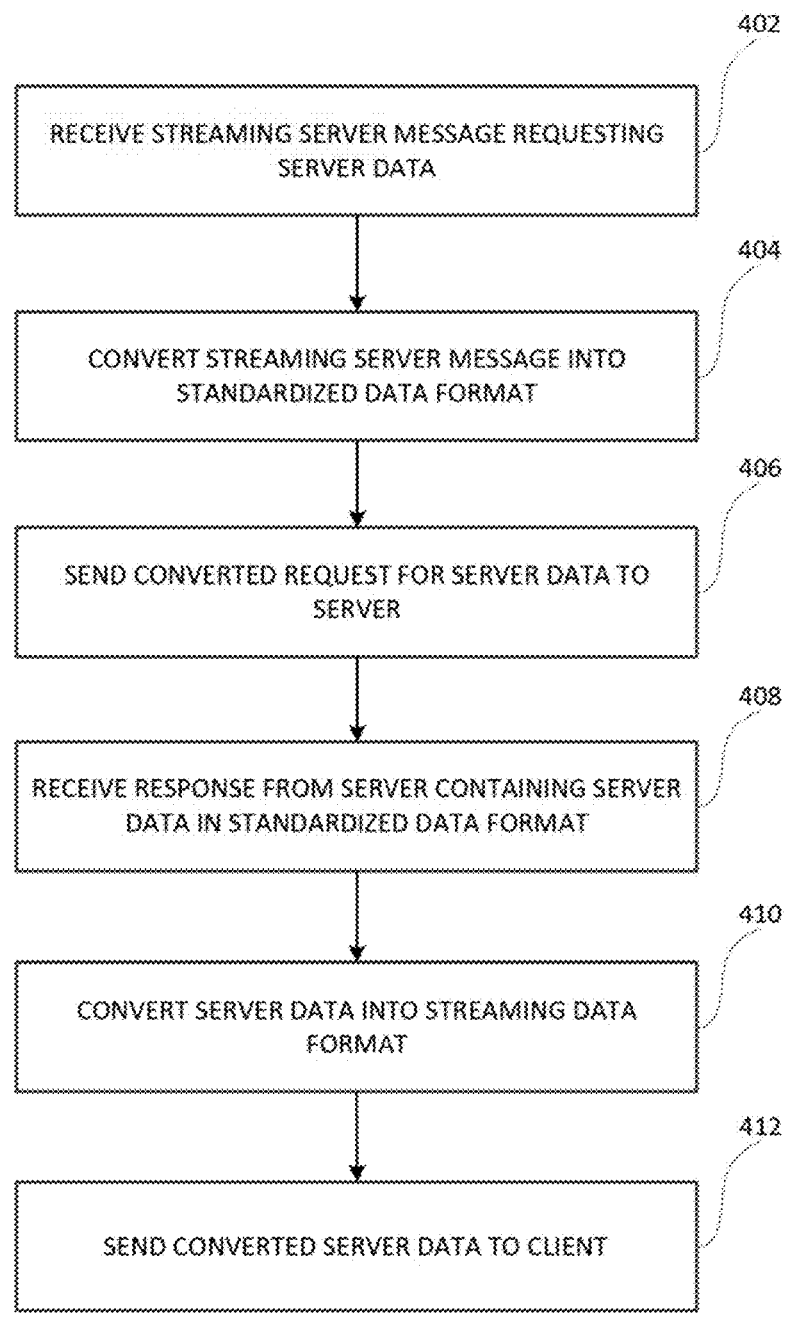
FIG. 4 is a flowchart of a process for using existing servers as data sources for streaming servers according to one aspect of the disclosure.

FIG. 4 is a flowchart describing a process for using existing servers as data sources for streaming servers according to one example.

In block 402, the streaming server 104 receives a streaming server message requesting data from an existing server. After establishing a communications pathway via the session handler module 210, a client (e.g., client device 102) can send a request message to the streaming server 104 in a streaming data format, which may be a WITSML 2.0 format. The streaming server 104 can receive the request message via communications port 206. The request message can include instructions to direct the streaming server 104 to establish a streaming communications channel with the client device 102 and to generate a polling task for continuously requesting data from an existing server (e.g., server 106) without further request by the client device 102.

In block 404, the streaming server 104 converts the streaming server message received into a standardized data format. The conversion module 216 of the streaming server 104 can convert the request message received in block 402 from a streaming data format into a standardized data format, which may be a WITSML 1.x format. Converting the request message from a streaming data format into a standardized data format can allow the request message data to be transformed into a format understood by the server 106, which uses different protocols than the client device 102.

In block 406, the streaming server 104 transmits the converted request message to the server 106. The communications port 206 of the streaming server 104 can transmit the request message in a standardized data format to the server 106. The converted request message can instruct the server 106 to receive the requested data from the database server 108, which can then be transmitted to the streaming server 104. The converted request message may be transmitted by the streaming server 104 using a SOAP request generated by the server message module 214, and then received by the server 106 that can implement WITSML 1.x protocol based on a RPC. The converted request message can include instructions for polling the server 106 generated by channel streaming module 212.

Still referring to block 406, a channel of the server message module 214 can be locked, such that the streaming server 104 will take no further action with respect to the server 106 that received the converted request message, until an appropriate response is received from the server 106. Once an appropriate response is received from the server 106, the server message module 214 can unlock that specific channel to allow for further action by the streaming server 104. The streaming server 104 can still establish and operate additional independent communication channels controlled by the server message module 214—the server message module 214 can establish and lock/unlock separate channels for communicating with multiple existing servers independent of the status of other channels.

In block 408, the streaming server 104 receives a response message from the server 106 containing the requested data in a standardized data format. In response to the request message in a standardized data format transmitted by the streaming server 106, the server 106 can communicate with the database server 108 to receive the requested data from the database server 108, convert the received data into a standardized data format if necessary, and transmit the requested data to the streaming server 104. This process can occur indefinitely until otherwise instructed, as further described in FIG. 6, allowing the server 106 to continuously transmit data to the streaming server 104. The streaming server 104 may receive the requested data using a SOAP response interpretable by the server message module 214. Further, in block 408, the streaming server 104 can determine if any of the data received from the server 106 is new or changed from previous versions of the data.

In block 410, the streaming server 104 converts the response message received from the server 106 into a streaming data format. The conversion module 216 of the streaming server 104 can convert the response message received at block 408 from a standardized data format into a streaming data format, which may be a WITSML 2.0 format. Converting the request message from a streaming data format into a standardized data format can allow the response message data to be transformed into a format understood by the client device 102, which uses different protocols than the server 106.

In block 412, the streaming server 104 transmits the response message in a streaming data format to the client device 102. The response message transmitted by the streaming server 104 in a streaming data format can include any data originating from the database server 108 that the client device 102 requested in block 402.

Figure 5:
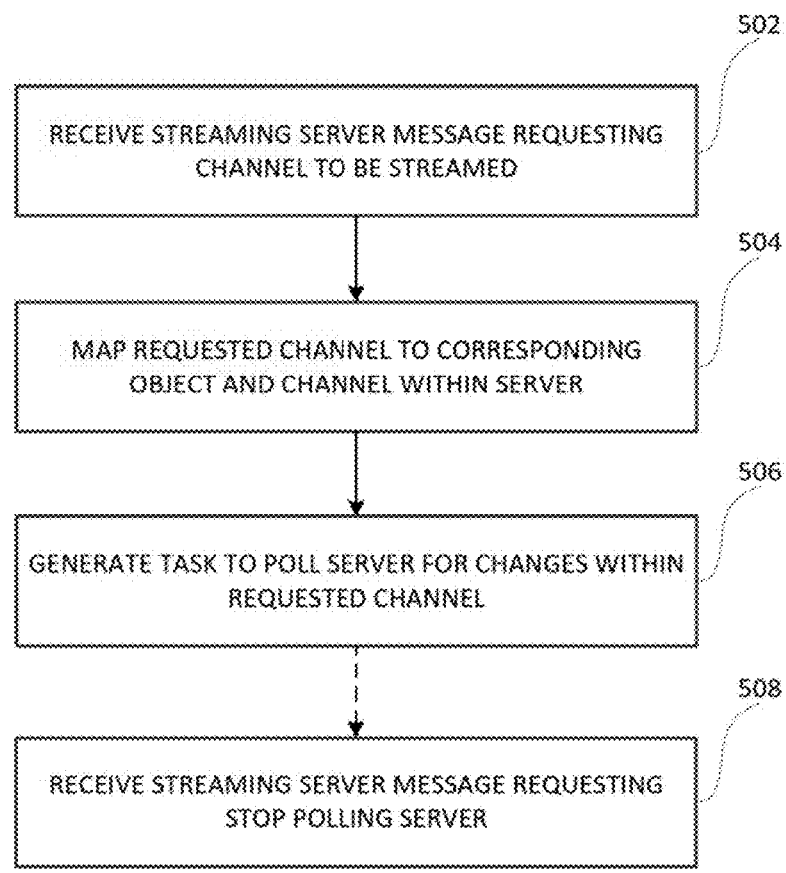
FIG. 5 is a flowchart of a process for initiating a data-streaming configuration between a streaming server and an existing server according to one aspect of the disclosure.

FIG. 5 is a flowchart describing a process for initiating a data-streaming configuration between a streaming server and an existing server according to one example.

In block 502, the streaming server 104 receives a streaming server message requesting data from the server 106 via a specific channel. The client device 102 may request streaming of any channel that the streaming server 104 communicates as available for streaming.

In block 504, the streaming server 104 maps the requested channel to a corresponding object and channel within the server 106. In response to receiving the streaming server message in block 502, the channel-streaming module 212 of the streaming server 104 can determine an appropriate object and channel of the server 106 corresponding to the data in the request message received from the client device 102. The streaming server 104 can map a channel dedicated to the client device 102 with the determined object and channel of the server 106. Mapping the client device 102 channel with the server 106 channel can allow the streaming server 104 to establish a streamlined communications pathway prior to transceiving requested data from the server 106 to the client device 102. The channel of the server 106 can be mapped to specific data or data channels within the database server 108 at the instruction of the streaming server 104, or by default prior to any communications with the streaming server 104.

In block 506, the streaming server 104 generates a task to poll the server 106 for changes within the requested channel. The channel-streaming module 212 can generate a task to poll the requested channel of the server 106, which can be mapped to specific data within the database server 108. The polling task instructions can be included in the request message in a standardized data format as described in block 406 of FIG. 4. The polling task can be generated in response to receiving a "channelstreamingstart" message. Once generated, the polling task can be initiated allowing the streaming server 104 to continuously request real-time data from the server 106 via consecutive request messages until the streaming server 104 receives a cease polling instruction.

In block 508, the streaming server 104 receives a streaming server message from the client device 102 requesting the streaming server 104 to stop polling the server 106. Upon receiving a cease polling instruction from the client device 102, the streaming server can stop generating request messages for real-time data across a channel corresponding to a specific server 106 and database server 108. The cease polling instructions may be a "channelstreamingstop" message. A client device 102 can reinitiate the polling process by transmitting a new streaming server request message to the streaming server 104 as described in block 402.

Figure 6:
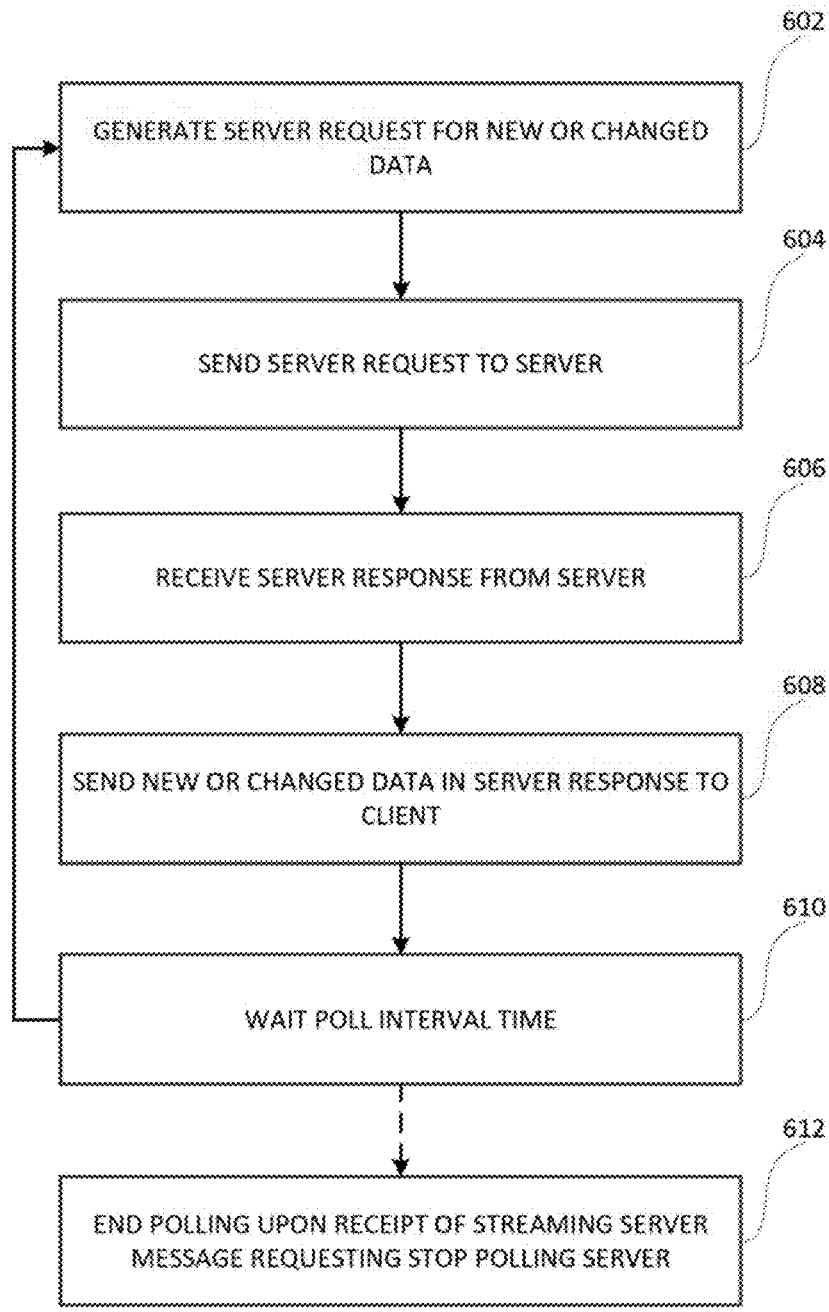
FIG. 6 is a flowchart of a data polling process between a streaming server and an existing server according to one aspect of the disclosure.

FIG. 6 is a flowchart describing a data polling process between a streaming server and an existing server according to one example. The following description of blocks 602, 604, 606, 608, and 610 provides further detail to the example described in block 506 of FIG. 5 for generating a polling task to poll changes within a requested channel.

In block 602, the streaming server 104 generates a server request for new or changed data from the server 106. As part of generating a polling task in block 506 at the request of the client device 102, the streaming server 104 can generate a server request to transmit to the server 106. The server request (as described in block 406 of FIG. 4) can be in a standardized data format, which may be a WITSML 1.x format. The server request to the server 106 can include instructions allowing the server 106 to monitor data in a given channel of the database server 108, and forward the data to the streaming server 104.

In block 604, the streaming server 104 transmits the server request to the server 106. The server request may be transmitted by the streaming server 104 using a SOAP request, and then received by the server 106, which may employ WITSML 1.x based on a RPC.

In block 606, the streaming server 104 receives a server response from the server 106. The polling task as depicted in FIG. 6 can halt polling processes until the server 106 returns a response to the server request transmitted in block 604. The streaming server 104 can determine if any of the data received in the server response from the server 106 is new or changed as compared to prior versions of the data.

In block 608, the streaming server 104 transmits new or changed data in the server response to the client device 102. The new or changed data can be converted into a streaming data format for transmission to the client device 102. If the streaming server 104 determines that the server response contains no new or changed data, the streaming server 104 may not send any information to the client device 102, and can proceed to block 610.

In block 610, the polling task waits for a predetermined poll interval time. The poll interval time can be any predetermined time set by a user. The poll interval time can also be any time capable of both minimizing bandwidth usage caused by repetitive server request and response messages and minimizing the time for the client device 102 to receive new or changed data upon the initial storage of the data in the database server 108. After waiting the duration of the poll interval time, the streaming server 104 polling task can begin a new cycle of requesting data from the server 106 by reinitiating the process described in blocks 602, 604, 606, 608, and 610, beginning in block 602.

In block 612, the streaming server 104 terminates polling after receiving a streaming server message from the client device 102 requesting the streaming server 104 to stop polling the server 106. Unless otherwise instructed via a cease polling request message from the client device 102, the streaming server 104 can indefinitely perform the looped polling operations as depicted in FIG. 6 and described in blocks 602, 604, 606, 608, and 610.

In some aspects, systems, devices, and methods for using existing servers as data sources for streaming servers according to one or more of the following examples:

Example 1 is a system comprising: a server communicatively couplable to a database server and comprising code stored in a non-transitory computer-readable medium and executable by a processor to communicate data about a wellbore environment with the database server and a streaming server using a request and response protocol; and the streaming server comprising: a network communications port; a processor; and a non-transitory computer-readable medium including code that is executable by the processor to cause the streaming server to provide a client device with access to data in the database server as streaming data by: communicating, via the network communications port, data in a standardized data format with the server; and communicating, via the network communications port, data in a streaming data format with a client device.

Example 2 is the system of example 1, wherein the streaming server is an Energistics Transfer Protocol (ETP) server, wherein the server is a Well Information Transfer Standard Markup Language (WITSML) server.

Example 3 is the system of example 2, wherein the standardized data format is a WITSML version 1 format and the streaming data format is an ETP format such that data is able to be communicated to the client device in response to the data being available without requiring data polling by the client device.

Example 4 is the system of example 1, wherein the streaming server and the server are communicatively couplable through a Local Area Network, and the streaming server and the client device are communicatively couplable through a Wide Area Network.

Example 5 is the system of example 1, the non-transitory computer-readable medium further including code that is executable by the processor to cause the streaming server to receive data from the server by: generating a polling task corresponding to a channel of the server, the polling task including polling task instructions to direct the server to relay new or changing data within the database server to the streaming server; transmitting, via the network communications port, the polling task instructions to the server; and receiving, via the network communications port, new or changed data of the channel from the server in response to the polling task instructions.

Example 6 is the system of example 1, the non-transitory computer-readable medium further including code that is executable by the processor to cause the streaming server to provide a client device with access to data in the database server as streaming data by: converting data received from the client device into the standardized data format; and converting data received from the server into the streaming data format.

Example 7 is the system of example 1, wherein the request and response protocol usable by the streaming server to communicate data with the server includes Simple Object Access Protocols, and the request and response protocol of the server includes Remote Procedure Calls.

Example 8 is a streaming server comprising: a network communications port communicatively couplable to a server that is communicatively couplable to a database server; a processor; and a non-transitory computer-readable medium including code that is executable by the processor to cause the streaming server to provide a client device with access to data about a wellbore environment in the database server as streaming data by: communicating, via the network communications port, data in a standardized data format with the server using a request and response protocol; and communicating, via the network communications port, data in a streaming data format with a client device.

Example 9 is the streaming server of example 8, wherein the streaming server is an Energistics Transfer Protocol (ETP) server, wherein the server is a Well Information Transfer Standard Markup Language (WITSML) server.

Example 10 is the streaming server of example 9, wherein the standardized data format is a WITSML version 1 format and the streaming data format is an ETP format such that data is able to be communicated to the client device in response to the data being available without requiring data polling by the client device.

Example 11 is the streaming server of example 8, wherein the streaming server and the server are communicatively couplable through a Local Area Network, and the streaming server and the client device are communicatively couplable through a Wide Area Network.

Example 12 is the streaming server of example 8, the non-transitory computer-readable medium further including code that is executable by the processor to cause the streaming server to receive data from the server by: generating a polling task corresponding to a channel of the server, the polling task including polling task instructions to direct the server to relay new or changing data within the database server to the streaming server; transmitting, via the network communications port, the polling task instructions to the server; and receiving, via the network communications port, new or changed data of the channel from the server in response to the polling task instructions.

Example 13 is the streaming server of example 8, the non-transitory computer-readable medium further including code that is executable by the processor to cause the streaming server to provide a client device with access to data in the database server as streaming data by: converting data received from the client device into the standardized data format; and converting data received from the server into the streaming data format.

Example 14 is the streaming server of example 8, wherein the request and response protocol usable by the streaming server to communicate data with the server includes Simple Object Access Protocols, and the request and response protocol of the server includes Remote Procedure Calls.

Example 15 is a method comprising: receiving, by a streaming server, a request from a client device to access data about a wellbore environment in a database server that is communicatively coupled to a server that is communicatively coupled to the streaming server; communicating, via the streaming server, data in a standardized data format with the server using a request and response protocol; and communicating, via the streaming server and in a streaming data format, data from the database server with a client device.

Example 16 is the method of example 15, wherein the streaming server is an Energistics Transfer Protocol (ETP) server, wherein the server is a Well Information Transfer Standard Markup Language (WITSML) server.

Example 17 is the method of example 16, wherein the standardized data format is a WITSML version 1 format and the streaming data format is an ETP format such that data is communicated to the client device in response to the data being available without requiring data polling by the client device.

Example 18 is the method of example 15, wherein the streaming server and the server are communicatively coupled through a Local Area Network, and the streaming server and the client device are communicatively coupled through a Wide Area Network.

Example 19 is the method of example 15, further comprising: converting data received from the client device into the standardized data format; generating, via the streaming server, a polling task corresponding to a channel of the server in response to receiving data from the client device, the polling task including polling task instructions to direct the server to relay new or changing data within the database server to the streaming server; transmitting, via the network communications port, the polling task instructions to the server in the standardized data format; receiving, via the network communications port, new or changed data of the channel from the server in response to the polling task instructions; and converting data received from the server into the streaming data format.

Example 20 is the method of example 15, wherein the request and response protocol usable by the streaming server to communicate data with the server includes Simple Object Access Protocols, and the request and response protocol of the server includes Remote Procedure Calls.

Example 21 is a streaming server comprising: a network communications port communicatively couplable to a server that is communicatively couplable to a database server; a processor; and a non-transitory computer-readable medium including code that is executable by the processor to cause the streaming server to provide a client device with access to data about a wellbore environment in the database server as streaming data by: communicating, via the network communications port, data in a standardized data format with the server using a request and response protocol; and communicating, via the network communications port, data in a streaming data format with a client device.

Example 22 is the streaming server of example 21, wherein the streaming server is an Energistics Transfer Protocol (ETP) server, wherein the server is a Well Information Transfer Standard Markup Language (WITSML) server.

Example 23 is the streaming server of any of example(s) 21 to 22, wherein the standardized data format is a WITSML version 1 format and the streaming data format is an ETP format such that data is able to be communicated to the client device in response to the data being available without requiring data polling by the client device.

Example 24 is the streaming server of any of example(s) 21 to 23, wherein the streaming server and the server are communicatively couplable through a Local Area Network, and the streaming server and the client device are communicatively couplable through a Wide Area Network.

Example 25 is the streaming server of any of example(s) 21 to 24, the non-transitory computer-readable medium further including code that is executable by the processor to cause the streaming server to receive data from the server by: generating a polling task corresponding to a channel of the server, the polling task including polling task instructions to direct the server to relay new or changing data within the database server to the streaming server; transmitting, via the network communications port, the polling task instructions to the server; and receiving, via the network communications port, new or changed data of the channel from the server in response to the polling task instructions.

Example 26 is the streaming server of any of example(s) 21 to 25, the non-transitory computer-readable medium further including code that is executable by the processor to cause the streaming server to provide a client device with access to data in the database server as streaming data by: converting data received from the client device into the standardized data format; and converting data received from the server into the streaming data format.

Example 27 is the streaming server of any of example(s) 21 to 26, wherein the request and response protocol usable by the streaming server to communicate data with the server includes Simple Object Access Protocols, and the request and response protocol of the server includes Remote Procedure Calls.

Example 28 is the streaming server of any of example(s) 21 to 27, wherein the streaming server is in a system that comprises: the server communicatively couplable to the database server and comprising code stored in a non-transitory computer-readable medium and executable by a processor to communicate data about the wellbore environment with the database server and the streaming server using a request and response protocol.

Example 29 is a method comprising: receiving, by a streaming server, a request from a client device to access data about a wellbore environment in a database server that is communicatively coupled to a server that is communicatively coupled to the streaming server; communicating, via the streaming server, data in a standardized data format with the server using a request and response protocol; and communicating, via the streaming server and in a streaming data format, data from the database server with a client device.

Example 30 is the method of example 29, wherein the streaming server is an Energistics Transfer Protocol (ETP) server, wherein the server is a Well Information Transfer Standard Markup Language (WITSML) server.

Example 31 is the method of any of example(s) 29 to 30, wherein the standardized data format is a WITSML version 1 format and the streaming data format is an ETP format such that data is communicated to the client device in response to the data being available without requiring data polling by the client device.

Example 32 is the method of any of example(s) 29 to 31, wherein the streaming server and the server are communicatively coupled through a Local Area Network, and the streaming server and the client device are communicatively coupled through a Wide Area Network.

Example 33 is the method of any of example(s) 29 to 32, further comprising: generating, via the streaming server, a polling task corresponding to a channel of the server, the polling task including polling task instructions to direct the server to relay new or changing data within the database server to the streaming server; transmitting, via the network communications port, the polling task instructions to the server; and receiving, via the network communications port, new or changed data of the channel from the server in response to the polling task instructions.

Example 34 is the method of any of example(s) 29 to 33, further comprising: converting data received from the client device into the standardized data format; and converting data received from the server into the streaming data format.

Example 35 is the method of any of example(s) 29 to 34, wherein the request and response protocol usable by the streaming server to communicate data with the server includes Simple Object Access Protocols, and the request and response protocol of the server includes Remote Procedure Calls.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a first server communicatively couplable to a database server and comprising code stored in a non-transitory computer-readable medium and executable by a processor to communicate data about a wellbore environment with the database server and a streaming server that is an Energistics Transfer Protocol (ETP) server using a request and response protocol; and
the streaming server comprising:
a network communications port;
a processor; and
a non-transitory computer-readable medium including code that is executable by the processor to cause the streaming server to provide a client device with access to data in the database server as streaming data by:
communicating, via the network communications port and via a local area network (LAN), data in a standardized data format with the first server; and
communicating, via the network communications port and via a wide area network (WAN), data in a streaming data format with a client device, the streaming data format being an ETP format such that data is able to be communicated to the client device in response to the data being available without requiring data polling by the client device.

2. The system of claim 1, wherein the first server is a Well Information Transfer Standard Markup Language (WITSML) server.

3. The system of claim 2, wherein the standardized data format is a WITSML version 1 format.

4. The system of claim 1, the non-transitory computer-readable medium further including code that is executable by the processor to cause the streaming server to receive data from the first server by:
generating a polling task corresponding to a channel of the first server, the polling task including polling task instructions to direct the first server to relay new or changing data within the database server to the streaming server;
transmitting, via the network communications port, the polling task instructions to the first server; and
receiving, via the network communications port, new or changed data of the channel from the first server in response to the polling task instructions.

5. The system of claim 1, the non-transitory computer-readable medium further including code that is executable by the processor to cause the streaming server to provide a client device with access to data in the database server as streaming data by:
converting data received from the client device into the standardized data format; and
converting data received from the first server into the streaming data format.

6. The system of claim 1, wherein the request and response protocol usable by the streaming server to communicate data with the first server includes Simple Object Access Protocols, and the request and response protocol of the first server includes Remote Procedure Calls.

7. A streaming server comprising:
a network communications port communicatively couplable to a first server that is communicatively couplable to a database server;
a processor; and
a non-transitory computer-readable medium including code that is executable by the processor to cause the streaming server that is an Energistics Transfer Protocol (ETP) server to provide a client device with access to data about a wellbore environment in the database server as streaming data by:
communicating, via the network communications port and via a local area network (LAN), data in a standardized data format with the first server using a request and response protocol; and
communicating, via the network communications port and via a wide area network (WAN), data in a streaming data format with a client device, the streaming data format being an ETP format such that data is able to be communicated to the client device in response to the data being available without requiring data polling by the client device.

8. The streaming server of claim 7, wherein the first server is a Well Information Transfer Standard Markup Language (WITSML) server.

9. The streaming server of claim 8, wherein the standardized data format is a WITSML version 1 format.

10. The streaming server of claim 7, the non-transitory computer-readable medium further including code that is executable by the processor to cause the streaming server to receive data from the first server by:
generating a polling task corresponding to a channel of the first server, the polling task including polling task instructions to direct the first server to relay new or changing data within the database server to the streaming server;
transmitting, via the network communications port, the polling task instructions to the first server; and
receiving, via the network communications port, new or changed data of the channel from the first server in response to the polling task instructions.

11. The streaming server of claim 7, the non-transitory computer-readable medium further including code that is executable by the processor to cause the streaming server to provide a client device with access to data in the database server as streaming data by:
converting data received from the client device into the standardized data format; and converting data received from the first server into the streaming data format.

12. The streaming server of claim 7, wherein the request and response protocol usable by the streaming server to communicate data with the first server includes Simple Object Access Protocols, and the request and response protocol of the first server includes Remote Procedure Calls.

13. A method comprising:
receiving, by a streaming server that is an Energistics Transfer Protocol (ETP) server, a request from a client device to access data about a wellbore environment in a database server that is communicatively coupled to a first server that is communicatively coupled to the streaming server;
communicating, via the streaming server over a local area network (LAN), data in a standardized data format with the first server using a request and response protocol; and
communicating, via the streaming server over a wide area network (WAN), and in a streaming data format, data from the database server with a client device, the streaming data format being an ETP format such that data is communicated to the client device in response to the data being available without requiring data polling by the client device.

14. The method of claim 13, wherein the first server is a Well Information Transfer Standard Markup Language (WITSML) server.

15. The method of claim 14, wherein the standardized data format is a WITSML version 1 format.

16. The method of claim 13, further comprising:
converting data received from the client device into the standardized data format;
generating, via the streaming server, a polling task corresponding to a channel of the first server in response to receiving data from the client device, the polling task including polling task instructions to direct the first server to relay new or changing data within the database server to the streaming server;
transmitting, via a network communications port, the polling task instructions to the first server in the standardized data format;
receiving, via the network communications port, new or changed data of the channel from the first server in response to the polling task instructions; and
converting data received from the first server into the streaming data format.

17. The method of claim 13, wherein the request and response protocol usable by the streaming server to communicate data with the first server includes Simple Object Access Protocols, and the request and response protocol of the first server includes Remote Procedure Calls.

18. The system of claim 4, the non-transitory computer-readable medium further including code that is executable by the processor to cause the streaming server to:
transmit a request for the data in the standardized format to the first server via the channel; and
subsequent to transmitting the request, lock the channel until a response to the request is received from the first server.

19. The streaming server of claim 10, the non-transitory computer-readable medium further including code that is executable by the processor to cause the streaming server to:
transmit a request for the data in the standardized format to the first server via the channel; and
subsequent to transmitting the request, lock the channel until a response to the request is received from the first server.

20. The method of claim 16, further comprising:
transmitting a request for the data in the standardized format to the first server via the channel; and
subsequent to transmitting the request, locking the channel until a response to the request is received from the first server.

* * * * *